(12) United States Patent
Sankaran et al.

(10) Patent No.: US 12,509,488 B2
(45) Date of Patent: Dec. 30, 2025

(54) PREPARATIVE CRYSTALLIZATION OF RECOMBINANT HUMAN INSULIN

(71) Applicant: BIOCON LIMITED, Bangalore (IN)

(72) Inventors: Sethumadhavan Sankaran, Bengaluru (IN); Sandeep Vishwanath Kamath, Bengaluru (IN); Qais Shabandri, Bengaluru (IN); Vibhava Shukla, Bengaluru (IN); Arul Marimuthu, Thanjavur-DT (IN); Ankita Saikia, Sivasagar (IN); Sai Srikar Kandukuri, Guntur (IN)

(73) Assignee: Biocon Limited, Bangalore (IN)

( * ) Notice: Subject to any disclaimer, the term of this patent is extended or adjusted under 35 U.S.C. 154(b) by 0 days.

(21) Appl. No.: 17/415,092

(22) PCT Filed: Jan. 9, 2020

(86) PCT No.: PCT/IB2020/050135
§ 371 (c)(1),
(2) Date: Jun. 17, 2021

(87) PCT Pub. No.: WO2020/144606
PCT Pub. Date: Jul. 16, 2020

(65) Prior Publication Data
US 2022/0064213 A1    Mar. 3, 2022

(30) Foreign Application Priority Data

Jan. 10, 2019    (IN) .............................. 201941001190

(51) Int. Cl.
*C07K 14/62*    (2006.01)
*C07K 1/30*    (2006.01)
*C30B 29/00*    (2006.01)

(52) U.S. Cl.
CPC .............. *C07K 1/306* (2013.01); *C07K 14/62* (2013.01); *C30B 29/00* (2013.01)

(58) Field of Classification Search
CPC .......... C07K 14/62; C07K 1/306; C30B 29/00
See application file for complete search history.

(56) References Cited

U.S. PATENT DOCUMENTS

| | | | |
|---|---|---|---|
| 2,910,014 | A | 10/1959 | Candlin, Jr. et al. |
| 7,875,700 | B2 | 1/2011 | Radhakrishnan et al. |
| 2001/0041786 | A1 | 11/2001 | Brader et al. |
| 2007/0034140 | A1* | 2/2007 | Thorne ..................... C30B 7/04 117/68 |
| 2014/0155574 | A1 | 6/2014 | Wang et al. |

FOREIGN PATENT DOCUMENTS

| | | |
|---|---|---|
| CA | 1155439 A | 10/1983 |
| CN | 102219851 A | 10/2011 |
| EP | 2708550 A1 | 3/2014 |
| WO | WO 2008065138 A1 | 6/2008 |
| WO | WO 2009104199 A1 | 8/2009 |
| WO | WO 2015084694 A2 | 6/2015 |
| WO | WO-2020144606 A1 | 7/2020 |

OTHER PUBLICATIONS

Drenth, Principle of Protein X-ray Crystallography, Springer-Verlag, New York, (1994) ISBN 0-387-94091-X, 12 pages (Year: 1994).*
MSDS data for 2-propanol, http://ptcl.chem.ox.ac.uk/MSDS/PR/2-propanol.html, pp. 1-2, Oct. 5, 2004. (Year: 2004).*
Iyire et al., "Pre-formulation and systematic evaluation of amino acid assisted permeability of insulin across in vitro buccal cell layers," Scientific Reports, Sep. 1, 2016, 6: 32498, pp. 1-15. (Year: 2016).*
Rossler et al., "Acoustic Injectors for Drop-On-Demand Serial Femtosecond Crystallography," Structure, Apr. 5, 2016, 24: 631-640. (Year: 2016).*
Atlas Scientific, "What Is Parts Per Million (ppm)? How Is It Calculated?" from https://atlas-scientific.com/blog/what-is-parts-per-million-ppm/?srsltid=AfmBOopQBZHMdzwNqxVxYGY2fW9J5cltqdcUgi5rEiwb_IqpaOuDIjZA, pp. 1-16. Accessed Jun. 3, 2025. (Year: 2025).*
Extended European Search Report for European Application No. EP 20738103.9 dated Oct. 12, 2022, 6 pages.
International Preliminary Report on Patentability for International Application No. PCT/IB2020/050135 dated Jun. 16, 2021, 6 pages.
International Search Report and Written Opinion for International Application No. PCT/IB2020/050135 mailed Mar. 18, 2020, 8 pages.
Bergeron, et al., "Thermodynamics of the hydrophobicity in crystallization of insulin," Biophys J. Dec. 2003; 85(6):3935-42.
Hekmat, D., "Large-scale crystallization of proteins for purification and formulation," Bioprocess Biosyst Eng. Jul. 2015; 38(7):1209-31. Epub Feb. 21, 2015.
Nanev, et al., "Protocol for growing insulin crystals of uniform size," Journal of Crystal Growth, vol. 375, 2013, pp. 10-15.
Ward, et al., "Landmarks in insulin research," Front Endocrinol (Lausanne). Nov. 22, 2011; 2:76. Prepublished online Oct. 11, 2011, 11 pages.
Zang, et al., "Towards protein crystallization as a process step in downstream processing of therapeutic antibodies: screening and optimization at microbatch scale," PLoS One. 2011; 6(9):e25282. Epub Sep. 22, 2011, 8 pages.

\* cited by examiner

*Primary Examiner* — Julie Ha
(74) *Attorney, Agent, or Firm* — COOLEY LLP

(57) ABSTRACT

The present invention discloses a method for crystallizing recombinant Human Insulin at lab and manufacturing scale in the presence of zinc chloride and sodium chloride mixture, higher concentration of organic solvent (IPA-19 to 25 million) and adjusting the pH to 5.0 at a faster rate (≤5 minutes). The method further comprises adopting procedures wherein the settling time is reduced and the holding temperature is altered in order to facilitate consistent protein crystal formation between 15 μm-30 μm and to increase the robustness of the process.

15 Claims, 12 Drawing Sheets

```
┌─────────────────────────────────────────────────────────────────┐
│                        RP-HPLC 3 EP                             │
└─────────────────────────────────────────────────────────────────┘
                                │
┌─────────────────────────────────────────────────────────────────┐
│ Dilution of RP-HPLC 3 EP to 5.0±0.2 g/L using WFI & IPA         │
│ targeting 21 million IPA content (ppm)                          │
└─────────────────────────────────────────────────────────────────┘
                                │
┌─────────────────────────────────────────────────────────────────┐
│ Addition of 4% ZnCl₂ + 0.5M NaCl (0.5mL/g of Protein + 40mM     │
│ NaCl to the FFC volume) @ 0.006 vvm in the final solution       │
│ under stirring condition at a tip speed of 0.42-0.52 m/s        │
└─────────────────────────────────────────────────────────────────┘
                                │
┌─────────────────────────────────────────────────────────────────┐
│ Re-adjusting the pH to 5.0±0.1 using 3M Acetic acid @ 0.1 vvm   │
│ under stirring condition at a tip speed of 0.42-0.52 m/s, post  │
│ pH adjustment continue agitation for 15-20 mins at 0.21m/s      │
└─────────────────────────────────────────────────────────────────┘
                                │
┌─────────────────────────────────────────────────────────────────┐
│ Stop agitation to allow neat settling at 24±3°C for 2.5 to 4.0  │
│ hours then chill the neat settling at 5±3°C for 16 hours        │
│ inclusive of 24±3°C hold (After 16th hour, sup conc. to be      │
│ determined every 2 hours unless sup conc. is ≤ 0.25 g/L)        │
└─────────────────────────────────────────────────────────────────┘
                                │
┌─────────────────────────────────────────────────────────────────┐
│ Neat sup decantation 85-90% (If sup. conc. is ≤0.25g/L or 24    │
│ hours of neat settling whichever is earlier)                    │
└─────────────────────────────────────────────────────────────────┘
                                │
┌─────────────────────────────────────────────────────────────────┐
│ Decanted neat supernatant volume should be in the range of      │
│ 85-90% of total neat settling volume                            │
└─────────────────────────────────────────────────────────────────┘
                                │
┌─────────────────────────────────────────────────────────────────┐
│ Addition of chilled WFI - 8 to 10 times of the neat slurry      │
│ volume, 8 (or) 10 times to be decided based on maximum volume   │
│ that can be accomodated into crystallizer at scale              │
└─────────────────────────────────────────────────────────────────┘
                                │
┌─────────────────────────────────────────────────────────────────┐
│ Post addition of chilled WFI, agitate the slurry at a tip speed │
│ of 0.21 m/s for NMT 5 minutes                                   │
└─────────────────────────────────────────────────────────────────┘
                                │
┌─────────────────────────────────────────────────────────────────┐
│ Stop agitation to allow wash settling at 5±3°C for 16 hours     │
│ (After 16th hour, sup conc. to be determined every 2 hours      │
│ unless sup conc. is ≤ 0.25 g/L)                                 │
└─────────────────────────────────────────────────────────────────┘
                                │
┌─────────────────────────────────────────────────────────────────┐
│ Wash sup decantation- If sup. conc. is ≤0.25g/L or 24 hours of  │
│ wash settling whichever is earlier.                             │
└─────────────────────────────────────────────────────────────────┘
                                │
┌─────────────────────────────────────────────────────────────────┐
│ Decant the wash supernatant such that the remaining wash slurry │
│ can be accomodated into the freeze dryer                        │
└─────────────────────────────────────────────────────────────────┘
                                │
┌─────────────────────────────────────────────────────────────────┐
│ Post decantation If wash wash slurry volume exceeds             │
│ lyophilizable volume, hold the slurry for an extra 12 hours at  │
│ 5±3°C to decant further                                         │
└─────────────────────────────────────────────────────────────────┘
                                │
┌─────────────────────────────────────────────────────────────────┐
│                        Freeze drying                            │
└─────────────────────────────────────────────────────────────────┘
```

FIGURE 1: (process of present invention)

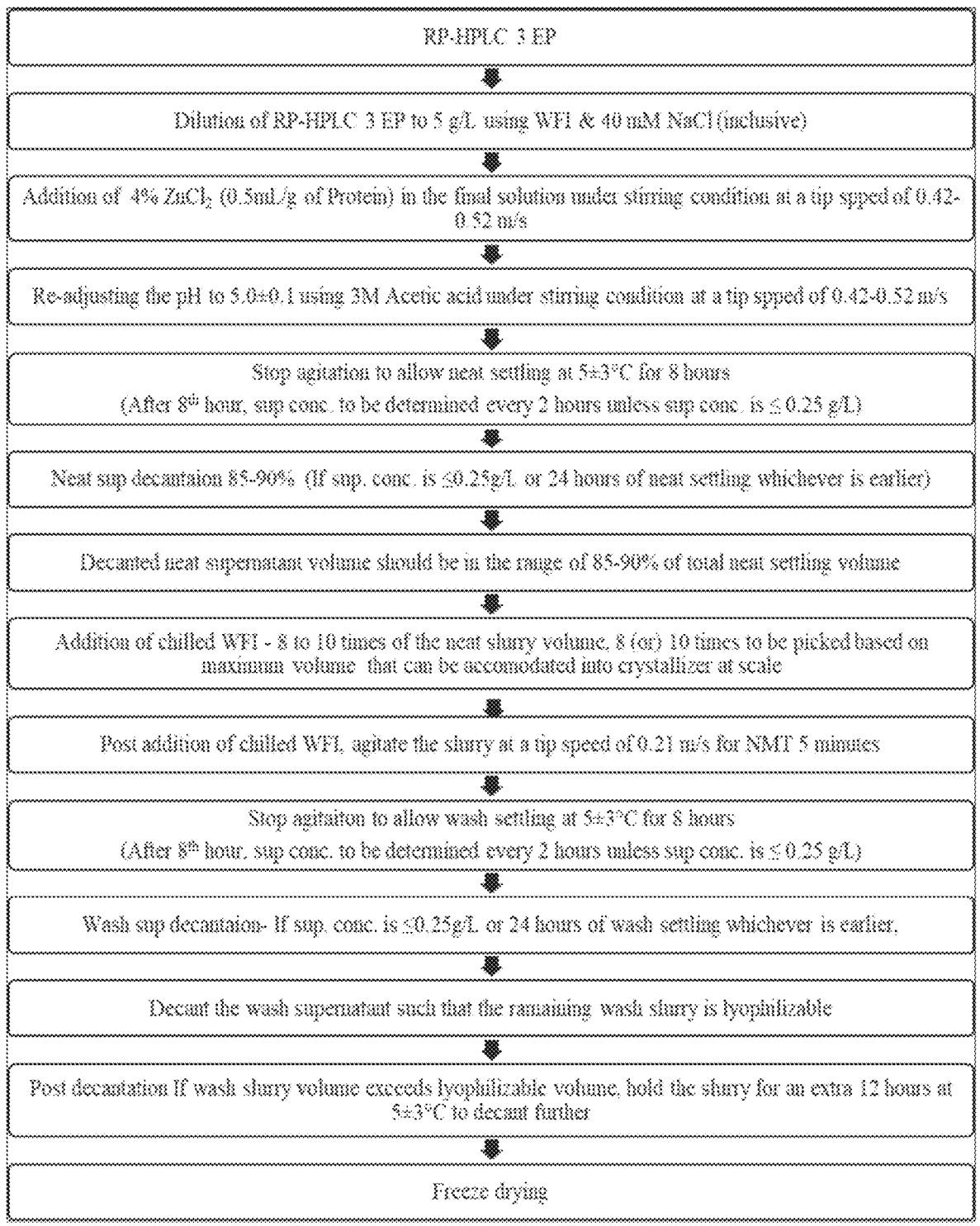
FIGURE. 2 (old process)

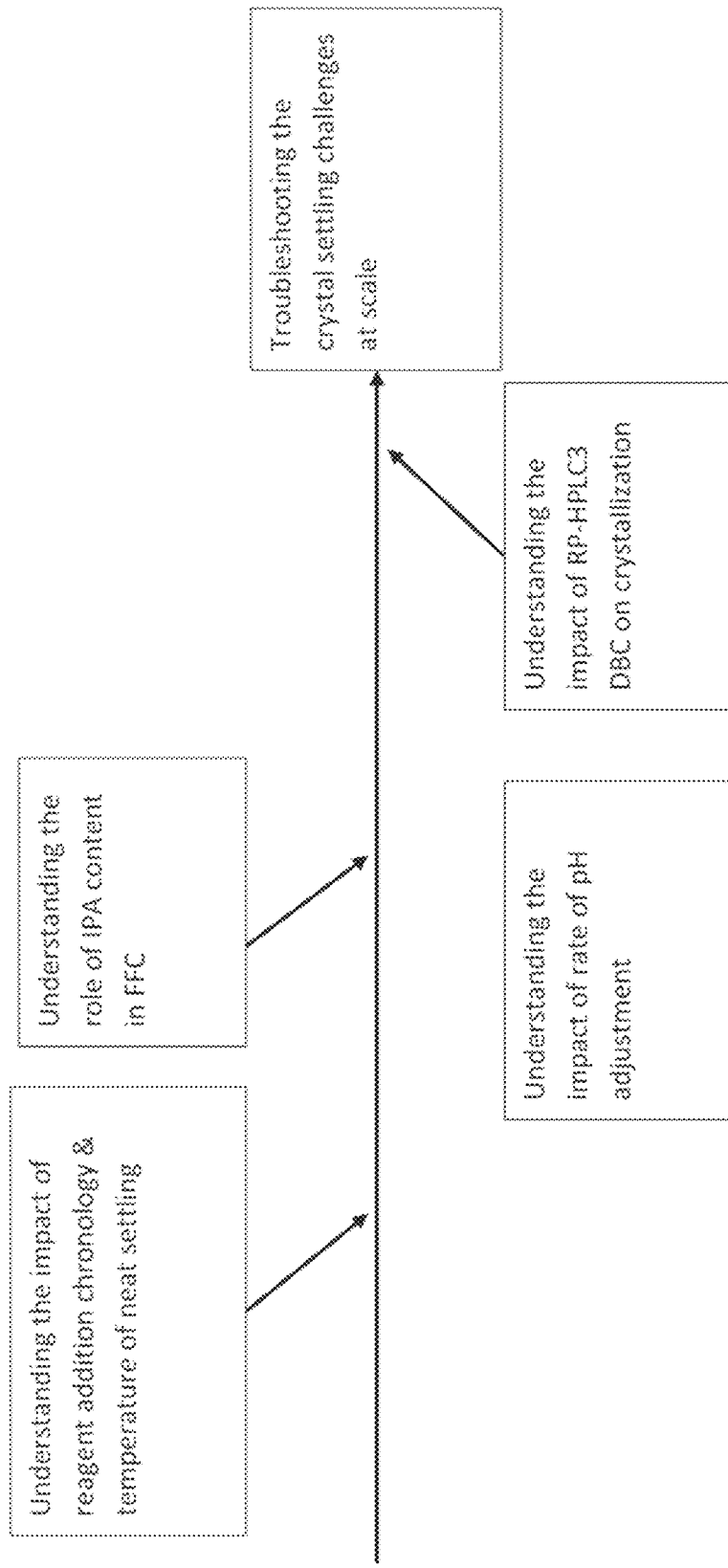
FIGURE 3 : Fishbone diagram of parameters to be studied in crystallization

| Trial No | T5 | T6 | T20 | T21 |
|---|---|---|---|---|
| Settling bed appearance | 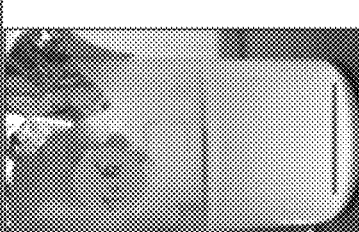 | 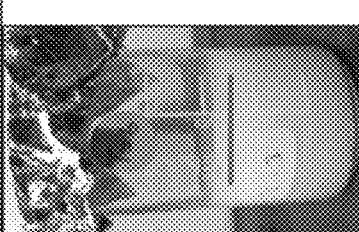 | 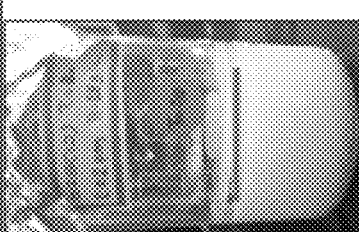 | 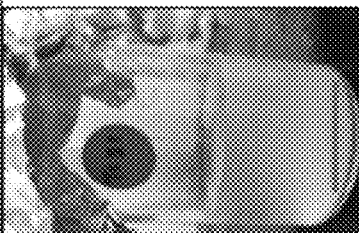 |
| Settling temperature | 24±3°C | 5±3°C | 5±3°C | 24±3°C |
| Settling (h) | 1.0 | NAP | NAP | 1.0 |
Red line indicates the bed height
FIGURE 4: Observations on reagent addition strategy 1

| Trial No | T18 | T19 | T20 |
|---|---|---|---|
| Settling bed appearance | | | |
| Crystal size | | | |
| IPA content (ppm) | 26409600 | 17965714 | 11603515 |

Red line indicates the settled bed

FIGURE 5A : Observations on reagent addition strategy 2

| Trial No | T23 | T25 | T26 |
|---|---|---|---|
| Settling bed appearance | 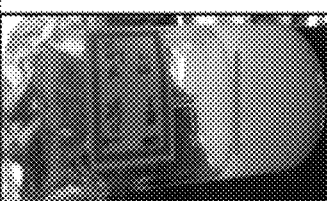 | 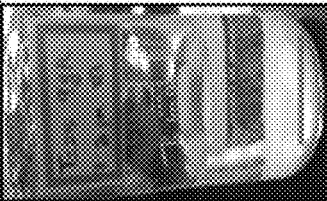 | 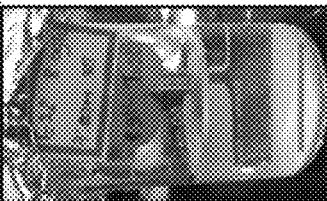 |
| Crystal Size | | | |
| IPA content (ppm) | 16506000 | 14672000 | 13204800 |
Red line indicates the settled bed.
FIGURE 5B : Observations on reagent addition strategy 2

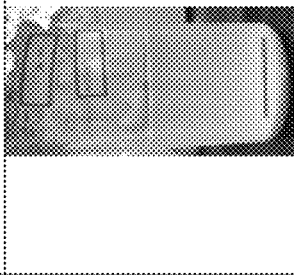
FIGURE 6: Observation of impact of IPA content in FFC

| Trial No | 002(09) | 002(10) | 002(11)* |
|---|---|---|---|
| Settling Bed appearance | | | |
| Crystal Size | 40X - <1 µm | 40X - 10 µm | 40X - 25 µm |
| IPA content (ppm) | 21 million | 21 million | 21 million |

Red line indicates the settled bed.

*002(11) image was captured at 1st log hour.

FIGURE 7A : Observation of impact of rate of pH adjustment

| Trial No | 002(13) | 002(14) | 002(15) |
|---|---|---|---|
| Settling Bed appearance | | | |
| Crystal Size | 40X - 20 µm | 40X - 20 µm | 40X - 20 µm |
| IPA content (ppm) | 21 million | 21 million | 21 million |

Red line indicates the settled bed.

FIGURE 7B : Observation of impact of rate of pH adjustment

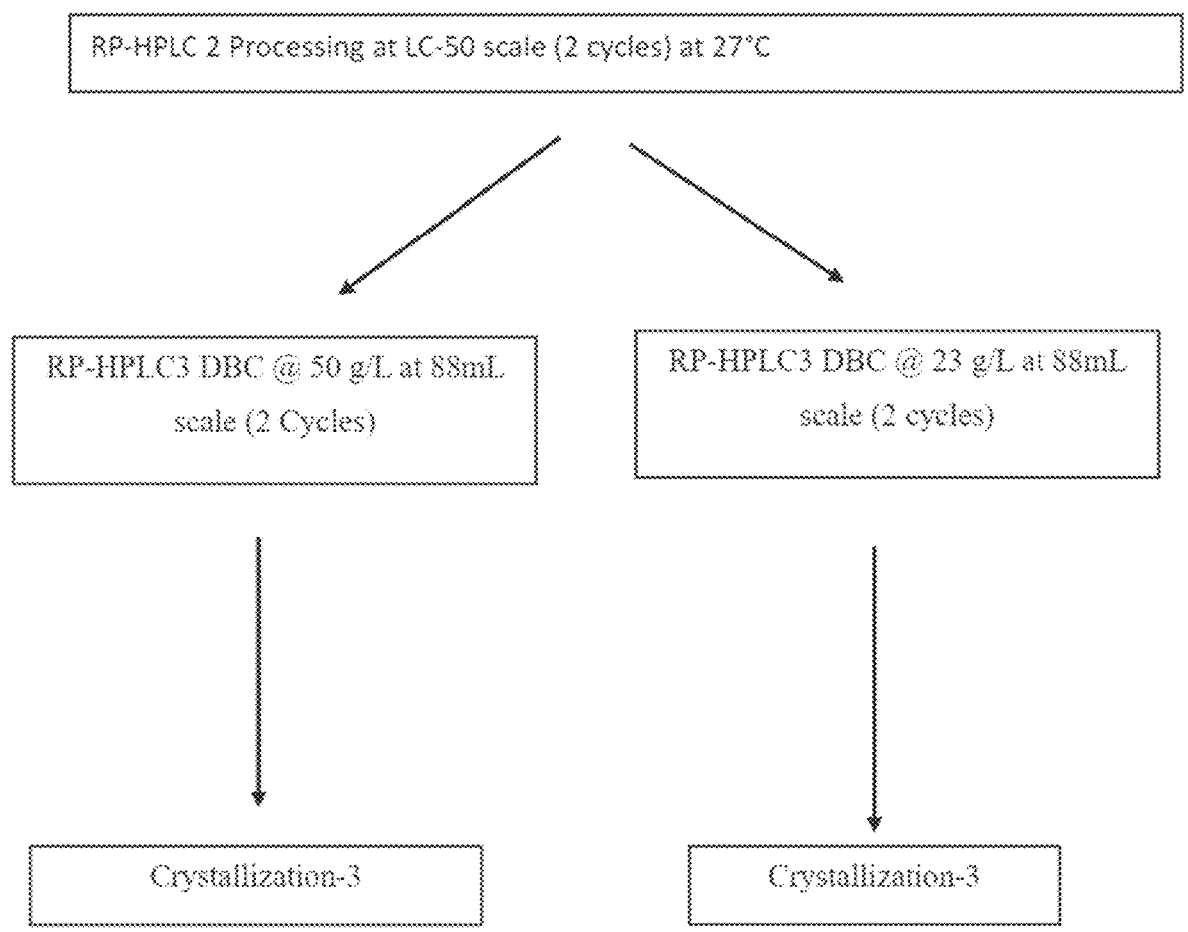
FIGURE 8 : RP-HPLC 3 DBC study flow chart

| Stage | Attributes | T003 | T004 | T006 |
|---|---|---|---|---|
| FFC | Conc. (g/L) | 4.96 | 5.01 | 5.14 |
| | Crystal images (40X) | 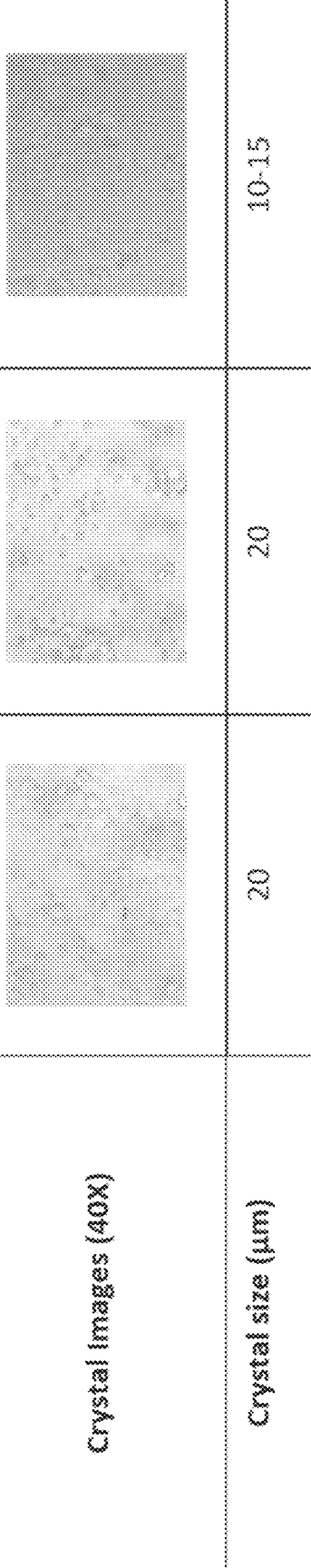 | | |
| | Crystal size (μm) | 20 | 20 | 10-15 |
FIGURE 9: Crystal size upon scale-up

PREPARATIVE CRYSTALLIZATION OF RECOMBINANT HUMAN INSULIN

CROSS-REFERENCE TO RELATED APPLICATIONS

This application is filed under the provisions of 35 U.S.C. § 371 and claims the priority of International Patent Application No. PCT/IB2020/050135 filed on Jan. 9, 2020 which in turn claims priority to Indian Application No. 201941001190, filed on Jan. 10, 2019, the contents of all is hereby incorporated by reference herein for all purposes.

FIELD OF INVENTION

The present invention relates to a method for peptide crystallization, particularly preparing recombinant human insulin crystal.

BACKGROUND OF INVENTION

Diabetes is a common endocrine and metabolic disorder. It's a long-term condition that causes high blood sugar levels. In type 1 Diabetes, the body does not produce Insulin, also referred to as Insulin-dependent diabetes, juvenile diabetes, or early-onset diabetes. In type 2 Diabetes, the body does not produce enough insulin for proper function, or the cells in the body do not react to Insulin (Insulin resistance). Presently patients with type 1 diabetes are treated with regular insulin injections along with a special diet and exercise. Patients with Type 2 diabetes are treated with tablets, exercise and a special diet, but sometimes insulin injections are also required.

'Insulin therapy' has always been considered as an important means for treating diabetes and controlling blood sugar level. Purification of recombinant Human Insulin achieved by multiple downstream unit operations that involve a combination of crystallization, enzyme catalysis and chromatography. The requirement of the highest purity of Human Insulin is to ensure the patients do not develop immunogenic or toxic responses to the drug product.

Recombinant Human Insulin crystallization occurs in two phases. The first phase is nucleation, the appearance of a crystalline phase from either a super cooled liquid or a supersaturated solvent. The second phase is crystal growth, which is the increase in the size of particles and leads to a crystalline state. The crystal form of recombinant Human Insulin is a better form, since it has a uniform and steady solid molecular form and small sediment volume, and is easy to separate from the supernatant, the time for centrifugation and freeze-drying is short, and the production efficiency is relatively high. It is thus desirable to prepare recombinant Human Insulin crystals and then apply the crystals to Insulin pharmaceutical preparations.

Commercial Insulin manufacturing processes typically include a crystallization step to convert soluble purified Insulin into solid form, providing increased stability for bulk storage prior to formulation and filling. Classical Insulin crystallization process as disclosed in U.S. Pat. No. 2,910,014 includes preparation of an acidic solution containing organic acid (acetic or citric), approximately 2 g/L Insulin, and zinc and adjustment of the solution pH to near the isoelectric point of insulin (pH 5.5-6.0), which initiated crystal formation.

It is well known in the art that Insulin may be crystallized in the presence of zinc ions, resulting in a crystalline preparation with significant benefits over amorphous, un-crystallized Insulin with regard to stability, storage, formulation, and/or administration. In the presence of zinc, human insulin self-assembles into stable hexameric structures. Zinc content plays an important role in chemical and physical stability of pharmaceutical insulin formulations.

The use of $ZnCl_2$ for crystallization of recombinant Human Insulin (rHI) is an established and well published technique, however, a similar knowledge is not available for crystallizing HI at a preparative scale. Traditional recombinant Human Insulin downstream purification process involves three crystallization steps termed as crystallization-1, crystallization-2 and crystallization-3, respectively as per the order of the operation. Controlling the level of aggregates, residual zinc and other related impurities during drug preparation is a critical quality requirement to make the final drug product complying with the specifications of the innovator. In the recent manufacturing batches of the biosimilar Insulin process, it was noted that level of high molecular weight protein (HMWP) and other related impurities were on the higher level. Crystallization-3 is a potential step, which is a final step of crystallization, where the chances of formation of aggregates (HMWP) and other related impurities are imminent.

Improper settling during the neat settling step was observed during this final crystallization stage(s). This suboptimal performance leads to the lower decantation percentage at neat and wash-1 stage resulting in suboptimal freeze-drying performance.

Therefore, there is a need to control the level of these impurities at the appropriate downstream step.

OBJECT OF INVENTION

An object of the present invention is to overcome the various key process challenges observed during the final crystallization & freeze drying stages of recombinant Human Insulin preparation and accordingly modify the process.

Another object of the present invention of preparative peptide crystallization is to obtain consistent crystal geometry and size of recombinant Human Insulin at preparative scale.

SUMMARY OF INVENTION

In one aspect the present invention provides a method for preparing recombinant Human Insulin crystal comprising the steps of:
  crystallizing the recombinant Human Insulin in a crystallization solution containing recombinant Human Insulin, an organic solvent, a zinc compound, a salt, such that, mixture of the zinc compound and salt was added together to the solution;
  pH was adjusted to 4.8 to 5.2; and
  the crystallization solution maintained at ambient temperature-before freeze-drying.

In another aspect the present invention provides a method comprising the steps of:
  1) diluting HPLC elution pool by water for irrigation and isopropyl alcohol till solution contains 5 g/L of recombinant human insulin and targeting 21 million ppm of isopropanol; thereto adding mixture of 4% zinc chloride and 0.5M sodium chloride at 0.006 volume per volume per minute under stirring condition at a tip speed of 0.42-0.52 m/s;
  2) adjusting the pH to 5.0 using 3M acetic acid within 5 minutes at 0.1 volume per volume per minute under stirring condition at a tip speed of 0.42-0.52 m/s, wherein, post pH adjustment agitation is continued for 15-20 minutes at 0.21 m/s;
3) adjusting the temperature of the above crystallization solution to 23±3° C. upon stopping agitation to allow neat settling for 2.5 to 4.0 hours; then allow the neat settling at 2-8° C. for 10-12 hours;
4) decanting about 85-90% of the supernatant, adding the chilled water to slurry in agitated state at a tip speed of 0.21 m/s for up to 5 minutes, then keeping at 2-8° C. for 16 hours;
5) decanting the supernatant and keeping slurry into the freeze dryer for drying.

BRIEF DESCRIPTION OF DRAWINGS

FIG. 1 represents flow chart of the process of crystallization of present invention.
FIG. 2 represents flow chart of the process of crystallization followed prior to present invention.
FIG. 3 represents the fishbone diagram of parameters studied in crystallization process of present invention.
FIG. 4 represents the observations on reagent addition strategy 1. The red line indicates the bed height.
FIG. 5A represents the observations on reagent addition strategy 2.
FIG. 5B represents the observations on reagent addition strategy 2.
FIG. 6 represents the observations of impact of IPA content in FFC.
FIG. 7A represents the observations of impact of rate of pH adjustment.
FIG. 7B represents the observations of impact of rate of pH adjustment.
FIG. 8 represents RP-HPLC 3 dynamic binding capacity study flow chart.
FIG. 9 represents the crystal size 15 μm-30 μm and 40× images of recombinant human insulin at various concentrations in FFC upon scale-up.

DETAILED DESCRIPTION OF INVENTION

Definitions

Figure 10A:
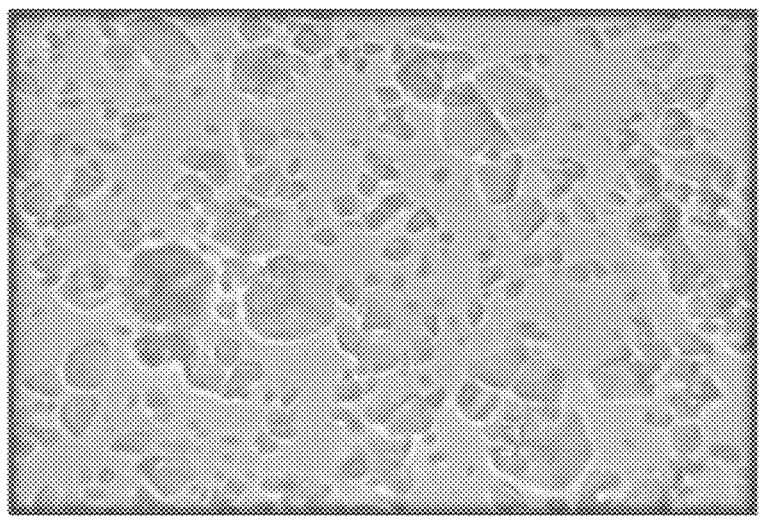
FIG. 10A represents the recombinant Human Insulin crystals prepared by traditional process wherein only zinc chloride is used.
Figure 10B:
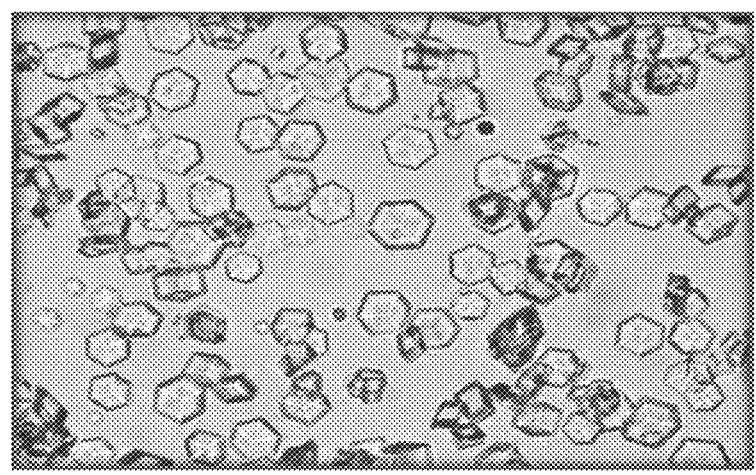
FIG. 10B represents the recombinant Human Insulin crystals prepared by process of present invention wherein mixture of zinc chloride and sodium chloride is used.
Figure 10C:
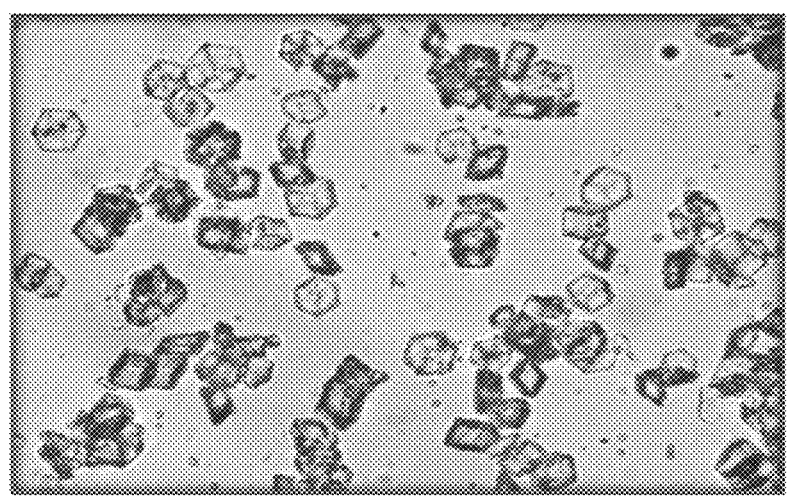
FIG. 10C represents the recombinant Human Insulin-drug substance crystals.

Unless otherwise defined herein; the scientific and technical terms used in connection with the present invention shall have the meanings that are, commonly understood by those of ordinary skill in the art. Further, unless otherwise required by context, singular terms shall include pluralities and plural terms shall include the singular. The methods and techniques of the present invention are generally performed according to conventional methods well known in the art. The nomenclatures used in connection with, and techniques described herein are those commonly used in the art. The methods and techniques of the present invention are generally performed according to conventional methods well known in the art.

The term 'ambient temperature' refers to the air temperature of an environment or object or surrounding an equipment. Room Temperature (RT) is generally defined as the ambient air temperature. In present invention, ambient temperatures or room temperature can range between 2° and 26° C.

The term 'crystallization' refers to the solid-liquid separation and purification technique in which mass transfer occurs from the liquid solution to a pure solid crystalline phase.

The term 'Insulin' refers to a hormone secreted by the islets of Langerhans in the pancreas; regulates storage of glycogen in the liver and accelerates oxidation of sugar in cells.

The term 'recombinant Human Insulin' and 'rHI' refer to a form of insulin made from recombinant DNA that is identical to human insulin.

The present inventors studied the process deviations for multiple batches at final crystallization and freeze-drying step and found that all deviations were due to the poor neat settling during the final crystallization process (also corroborated by the smaller crystal size i.e. <1 μm). After a thorough root cause analysis (elaborated through the examples below), following factors have been identified to be affecting the crystal size and subsequent settling—

IPA content in final FFC (feed for crystallization)
Chronology of reagent addition (NaCl first, followed by $ZnCl_2$)
Insufficient ambient temperature (24±3° C.) incubation after final pH (5±0.1) adjustment
Rate of addition of acetic acid (3M) for pH adjustment Further, freeze drying failure (improper product drying) was primarily due to the cascading effect of the suboptimal settling in preceding crystallization step. This resulted in higher slurry volume post wash decantation that was almost 12% higher than the expected volume. This led to the loading of each freeze-drying tray with higher bed height and lower slurry percentage (5%). It was found that lower ambient temperature resulted in poor settling while higher hold duration would lead to increase in aggregates (HMWP). It was further observed that at lower slurry percentage higher bed height is detrimental for efficient product drying.

FIG. 1 describes the process of recombinant Insulin crystallization followed in present invention whereas FIG. 2 describes the old process of Insulin crystallization followed prior to the present invention. To mitigate the above mentioned factors affecting crystal size and subsequent settling, the observations made at manufacturing scale wherein process parameters as captured in FIG. 3 were studied.

In order to mitigate the problems of the old process, the present invention provides an improved method for preparing recombinant Human Insulin crystal comprising the steps of crystallizing the recombinant Human Insulin in a crystallization solution containing recombinant Human Insulin, an organic solvent, a zinc compound, a salt, such that, the mixture of zinc compound and the salt are added together in crystallization solution followed by a pH adjustment to 4.8 to 5.2, preferably 5.0.

The present invention, particularly provides an improved crystallization-3 process with FFC targeting 21 million IPA content (ppm).

The concentration of the recombinant human insulin in the crystallization solution is 5.0±0.2 g/L.

In the present invention, the organic solvent is selected from acetonitrile, ethanol, n-propanol and isopropyl alcohol, preferably isopropyl alcohol. The concentration of isopropyl alcohol is from 19 to 25 million ppm, preferably 21 million ppm.

The zinc compound is selected from zinc chloride, zinc oxide, zinc acetate, zinc bromide and zinc sulfate. The salt is selected from sodium chloride, sodium acetate and sodium citrate. Preferably, the solution contains 4% zinc chloride at a concentration of 0.3-0.5 ml per gram of recombinant Human Insulin and 0.5M sodium chloride, which is added as a solution to the crystallization solution.

The pH of the crystallization solution was adjusted in the range of 4.8 to 5.2 using 3M acetic acid within 5 minutes after addition of mixture of zinc chloride and sodium chloride mixture in the crystallization solution.

In a preferred embodiment, the crystallization solution is held at the ambient temperature of 24±3° C. for 2.5 to 4 hours for neat settling, upon which, the chilling of neat settling is achieved at 2-8° C. for 10-12 hours. Further, the slurry is held at 2-8° C. for another 16 hours. The slurry obtained therein is freeze dried.

Elution pool of HPLC was diluted by WFI and IPA followed by addition of solution of $ZnCl_2$+NaCl mixture. The adjustment of 5.0 pH was achieved within 5 minutes of such addition. It was surprisingly found that the faster rate of pH adjustment and the maintenance of ambient/room temperature is vital for protein crystallization, settling and consistent crystal size. The steps of neat settling and complete wash are performed at cold temperature (5±3° C.), which adds to the process robustness and better control of critical quality attributes at final drug substance stage. The 1.1 cm bed height of loading tray used during freeze-drying step for efficient product drying.

In a particular embodiment, the present invention provides a method comprising steps of:
  a) diluting HPLC elution pool by water for irrigation and isopropyl alcohol till solution contains 5 g/L of recombinant human insulin and targeting 21 million ppm of isopropanol; thereto adding solution mixture of 4% zinc chloride and 0.5M sodium chloride at 0.006 volume per volume per minute under stirring condition at a tip speed of 0.42-0.52 m/s;
  b) adjusting the pH to 5.0 using 3M acetic acid within 5 minutes at 0.1 volume per volume per minute under stirring condition at a tip speed of 0.42-0.52 m/s, wherein, post pH adjustment agitation is continued for 15-20 minutes at 0.21 m/s;
  c) adjusting the temperature of the above crystallization solution to 23±3° C. upon stopping agitation to allow neat settling for 2.5 to 4.0 hours; then allow the neat settling at 2-8° C. for 10-12 hours;
  d) decanting about 85-90% of the supernatant, adding the chilled water to slurry in agitated state at a tip speed of 0.21 m/s for up to 5 minutes, then keeping at 2-8° C. for 16 hours;
  e) decanting the supernatant and keeping slurry into the freeze dryer for drying.

The present method yields recombinant Human Insulin having a consistent crystal size of about 15 μm-30 μm. It also reduces the time required for sedimentation at manufacturing scale to about 12 hours compared to traditional process wherein the sedimentation step requires 24-60 hours whereas the present invention achieves the same in 12 hours.

Materials and Method

Table 1 elaborates the material and the grade of material used for the altering of crystallization-3 process for crystallizing recombinant human insulin.

TABLE 1

Material and its grade

| Sr. No. | Name | Grade |
|---|---|---|
| 1 | ACN (Acetonitrile) | CG (Commercial Grade) |
| 2. | $CH_3COOH$ (Acetic acid) | MCG (Multi Compendial grade) |
| 3 | $MgCl_2$ (Magnesium Chloride) | SQ (Special Quality) |
| 4. | Glacial Acetic acid | ExcelaR |
| 5. | Tris Buffer | AR (Analytical Reagent) |
| 6 | Sodium Sulphate anhydrous | MCG |
| 7. | L-Arginine | Reagent Grade |
| 8. | $ZnCl_2$ (Zinc Chloride) | MCG |
| 9. | Ortho-phosphoric acid | HPLC Grade (High Performance Liquid Chromatography Grade) |
| 10. | Acetonitrile Gradient | HPLC Grade |
| 11. | Acetic acid | HPLC Grade |
| 12. | TFA (Tri-Fluoroacetic Acid) | HPLC Grade |
| 13. | HCl (Hydrochloric Acid) | ACS (American Chemical Society) reagent |
| 14. | Acetophenone | Reagent Plus |
| 15. | IPA (Isopropyl Alcohol) | CG (Commercial Grade) |
| 16. | NaOH (Sodium Hydroxide) | SQ (Special Quality) |
| 17. | NaCl (Sodium Chloride) | USP (United States Pharmacopeia) grade |
| 18. | $H_2SO_4$ (Sulfuric Acid) | AR |
| 19. | Ultra clean LDPE (Low Density polyethylene) sheets | Medical grade |
| 20. | Ultra clean Tyvek sheets | Medical grade |

Table 2 elaborates the reagents and method of its preparation used for the present invention of altering of crystallization-3 process for crystallizing recombinant human insulin.

TABLE 2

Reagents and its method of preparation

| Sr. No | Reagent Name | Preparation |
|---|---|---|
|  | 0.01N HCl | Measure 900 ml of water and then add 0.86 mL of concentrated HCl (11.65N). Make up the final volume to 1 L using MilliQ water. |
| 1 | 1M Acetic acid | Measure 750 ml of water and then add 57.5 ml of Glacial acetic acid (17.4M). Make up the final volume to 1 L using purified water, filter through 0.2 micron PES (polyethersulfone) filter. |
| 2 | Diluent (for in-process samples): 95% (0.1% TFA water) + 5% HPLC ACN | Measure 949.05 mL of water and then add 0.95 mL of HPLC grade TFA. Make up the final volume to 1 L using HPLC grade Acetonitrile. |

TABLE 2-continued

Reagents and its method of preparation

| Sr. No | Reagent Name | Preparation |
|---|---|---|
| 3 | 2M Tris | Dissolve 242.28 g of Tris base in 900 ml purified water and make up the volume to 1 L using purified water. Filter through 0.2 PES filter. |
| 4 | RP-HPLC 2 Mobile phase A: 100 mM Tris (Hydroxy methyl amino methane) buffer + 20 mM Magnesium Chloride at pH8.50 ± 0.10 | For preparation of 1.0 L, add 12.114 g of Tris and 4.066 g of MgCl2 in 800 ml of purified water and adjust the pH 8.5 ± 0.05 using acetic acid and make up the volume to 1 L using purified water, filter through 1.2 PP (Polypropylene) and 0.2 micron PES (Polyether Sulphone) filter. |
| 5 | RP-HPLC 3 Mobile phase A: 25 mM Acetic acid | For preparation of 1.0 L, add 1.43 mL of acetic acid to 998.56 mL of WFI (Water For Irrigation) and filter through 1.2 PP and 0.2 micron PES filter. |
| 6 | 25 mM Sodium hydroxide | Dissolve 1.0 g of Sodium hydroxide pellets in 700 ml of purified water. Make up the volume to 1 L using purified water, filter through 1.2 and 0.2 micron filter. |
| 7 | Crystallization-3: 4% Zinc Chloride | Dissolve 40 g of Zinc chloride (MCG) in 700 ml of WFI water. Adjust the pH to 4.6 ± 0.05 with acetic acid. Make up the volume to 1 L with WFI and filter the buffer through 0.2 PES micron filter. |
| 8 | Crystallization-3: 3M Acetic acid | Measure 750 mL of water and then add 172.5 ml of Glacial acetic acid (17.4M). Make up the final volume to 1 L using WFI water. |
| 9 | Crystallization-3: 0.5M NaCl | Dissolve 29.22 g of Sodium chloride in 700 ml of WFI. Make up the volume to 1 L using WFI, filter through 0.2 micron filter. |

Table 3 elaborates the analytical method(s) used for the altering of crystallization-3 process for crystallizing recombinant human insulin. The table also elaborates the stage of process during which the particular method been used.

TABLE 3

Analytical methods and stage of process where it has been used

| Sr. No. | Analytical method | Stage |
|---|---|---|
| 1. | Insushort | DSP III (Downstream Process III) (RP-HPLC to Drug substance) |
| 2. | HMWP | DSP III (Crystallization-3 to Drug substance) |
| 3. | RS (related substance) | DSP III (Drug substance) |
| 5. | LOD (Loss on drying) | Drug substance |
| 6. | ROI | Drug substance |
| 7. | Zinc | Drug substance |
| 8. | Solvent Analysis | Drug substance |

Table 4 elaborates the name and model of the equipment used for the altering of crystallization-3 process for crystallizing recombinant human insulin.

TABLE 4

Equipment details

| Sr. No. | Name | Model/Make |
|---|---|---|
| 1. | Preparative HPLC | Shimadzu LC-8A & Akta Explorer100 |
| 2. | Analytical HPLC | Agilent HPLC-1200/1100 & Shimadzu LC-2010 |
| 3. | Weighing Balance | Sartorius & Metter Toledo |
| 4. | pH & conductivity meter | Eutech |
| 5. | Cold room | Blue star |
| 6. | Deep freezer | Vest frost |
| 7. | Magnetic stirrer | Shalom Instruments |
| 8. | Preparative column | Novasep Process LC50.500.VE100 |
| 9. | Lyophilizer | Tofflon Lyo-0.4(CIP, SIP) & Telstar Lyobeta |
| 10. | Chiller | Werner Finely Pvt Ltd & Julabo Chiller |
| 11. | Fume hood | Kewaunee Scientific Corporation |
| 12. | Muffle furnace | Servewell instruments Pvt Ltd |
| 13. | Burner | Guna Enterprises |
| 14. | LOD | Servewell instruments Pvt Ltd |
| 15. | Microscope | Olympus CX41 |

Table 5 elaborates the preparative and analytical columns used for the altering of crystallization-3 process for crystallizing recombinant human insulin.

TABLE 5

List of Preparative and Analytical columns

| Sr. No. | Column Name | Model/Make |
|---|---|---|
| 1. | HMWP SEC 10 μm, 7.8 × 300 Å | WATERS HMWP |
| 2. | ACE 250 * 4.6 mm, 5 μm, 300 Å C18 | Advanced chromatography Technologies |
| 3. | Vydac C18, 5 μm, 250 * 4.6 mm | Grace Vydac |
| 4. | Kromasil 100 Å C8, 13 μm, 250 * 4.6 mm | Kromasil ® |

Table 6 elaborates revised crystallization-3 process parameters and ranges followed in present invention related to the altering of crystallization-3 process for crystallizing recombinant human insulin.

TABLE 6

Revised crystallization process parameter and ranges

| Process parameters | Ranges |
|---|---|
| FFC (feed for crystallization) Concentration | 5.0 ± 0.2 g/L |
| IPA content (ppm*) in FFC | 21 million |
| Molarity of NaCl for FFC volume | 40 ± 1 mM |
| 4% $ZnCl_2$ + 0.5M NaCl addition rate | ≤0.006 vvm |
| Tip speed during 4% $ZnCl_2$ + 0.5M NaCl addition | 0.42 to 0.52 m/s |
| Expected consumption of 3.0M acetic acid based on FFC volume | 0.3 to 0.4% v/v |
| Volume of 3.0M acetic acid to be added in first pulse | 70 to 75% (of the expected consumption) |
| Rate of pH adjustment (for first pulse) | ≥0.1 vvm |
| Tip speed during pH adjustment | 0.42 to 0.52 m/s |
| Agitation time post pH adjustment | 15 to 20 min |
| Tip speed post pH of 5.0 ± 0.1 attained (15-20 min) | 0.21 m/s |
| Incubation time at 24 ± 3° C. post pH agitation completion | 2.5 to 4.0 hours |
| Neat settling temperature post 24 ± 3° C. incubation | 5 ± 3° C. |
| $1^{st}$ neat supernatant sampling | 16 hours |
| Tip speed during Wash mixing | 0.21 m/s |
| Wash settling temperature | 5 ± 3° C. |
| Mixing duration during wash (after adding WFI) | Not more than 5 minutes |
| Wash settling temperature | 5 ± 3° C. |
| $1^{st}$ wash supernatant sampling | 16 hours |

*ppm-refers to "μg" of IPA per "g" of Human Insulin in FFC

Parts per million (ppm) calculations used for measuring small concentrations in a solution. In present invention, it was required to prepare an accurate of amount blank buffer (L) for dilution of RP-HPLC3 Elution Pool (EP) (5.0±0.2 g/L) based on the formula elaborated in table 7 below.

TABLE 7

Formulae for IPA content calculations

Dilute the RP-HPLC3 EP to 5.0 g/L with blank buffer

Feed for crystallization (L) =

$$\left\{ \frac{\left[ \text{Conc. of } RPHPLC3\ EP\left(\frac{g}{L}\right) \times \text{Volume of total } RPHPLC3EP\ (L) \right]}{5.0\left(\frac{g}{L}\right)} \right\}$$

Blank buffer volume (L) = Volume of Feed for crystallization (L) − Volume of RP-HPLC3EP (L)
Formula to calculate IPA (ppm) content in RP-HPLC3 EP
X + Y (ppm) = 21000000 (ppm)
Where X is IPA content in ppm (already available in RP-HPLC3 EP), while Y is required amount of IPA (ppm) to be contributed by blank buffer for dilution of RP-HPLC3 EP.

$IPA(\%)$ in $RPHPLC3\ EP =$ $$\frac{\%\ B \text{ of the first fraction of } EP + \%\ B \text{ of the last fraction of } EP}{2}$$

X (ppm) = IPA content in ppm (already available in RP-HPLC3 EP)

$$X = \left\{ \frac{\left[ IPA \text{ in } RPHPLC3\ EP\ (\%) \times \text{Volume of total } RPHPLC3\ EP\ (L) \times \text{Density of } IPA\left(\frac{kg}{L}\right) \times 1000 \times 1000 \right]}{\text{Total product in } RPHPLC3(kg) * 100} \right\}$$

Y (ppm) = 21000000 − X (ppm)
Formula to calculate blank buffer IPA strength (%) for RP-HPLC3 EP dilution
Blank buffer IPA strength (%) =

$$\left\{ \frac{[Y(\text{ppm}) \times \text{Total product in } RPHPLC3\ EP\ (\text{kg})]}{\text{Blank buffer volume (L)} \times \text{Density of } IPA \text{ stock}\left(\frac{kg}{L}\right) \times 1000 \times 1000} \right\} \times 100$$

*Density of IPA stock = 0.786 Kg/L
Formula to calculate volume of IPA (L) in blank buffer Volume of $IPA$ (L) =

$$\left\{ \frac{[\text{Blank buffer IPA strength}(\%) \times \text{Blank buffer volume (L)}]}{100} \right\}$$

Formula to calculate volume of WFI (L) in blank buffer
Volume of WFI in Blank buffer (L) = Volume of Blank Buffer (L) − Volume of IPA (L)

The present invention is further elaborated with the help of following examples. However, these examples should not be construed to limit the scope of present invention.

Example 1: The Impact of Reagent Addition Chronology and Temperature of Neat Settling Haziness was observed in the FFC (feed for crystallization) upon NaCl addition during the satellite trials conducted at the laboratory. NaCl used to hasten the rate of settling during the crystallization process. Thus, based on this attributed purpose of NaCl, experiments were performed to understand whether the change in chronology of NaCl addition would mitigate the haziness observed in the FFC of the batch.

The reagent addition chronology was studied in two strategies viz.

Strategy 1: Addition of 0.5M NaCl post pH adjustment of the crystallization mixture.

Strategy 2: Addition of 4% $ZnCl_2$+0.5M NaCl mixture to the FFC at 5.0 g/L.

The Strategy 1 is Addition of 0.5M NaCl post pH adjustment of the crystallization mixture elaborated as follows in table 8 and 9.

Table 8 elaborates the details of the reagent addition performed in strategy 1. In strategy 1, the RP-HPLC 3 elution pool (EP) of 8.70 g/L concentration was diluted to 5.0 g/L with WFI. This dilution was followed by addition of $ZnCl_2$, which was immediately followed by pH adjustment to 5.0±0.1. NaCl was added to the mixture and it was held at 24±3° C. until neat settling. Table 9 elaborates the details of the observations on reagent addition of strategy 1.

From the trial experiments T5, T6, T20 & T21 (shown in FIG. 4) it was observed that reverse chronology (i.e. addition of NaCl at the very last) did not result in a consistent settling. However, the necessity of ambient hold (24±3° C.) was evident. This observation of ambient hold (subjective to settling observation) was thus maintained constant for all the successive experiments.

TABLE 8

Details of strategy-1 reagent addition

| Sr. No. | Trial No. | Conditions |
|---|---|---|
| 1. | T5 | RP-HPLC 3 EP 8.70 g/L concentration. diluted to 5.0 g/L with WFI, the dilution performed to attain 5 g/L was inclusive of 40 mM NaCl. Post dilution, crystallization-3 was performed by addition of required amount of 4% $ZnCl_2$ (0.5 mL/g). pH of the resultant solution was adjusted with 3.0M acetic acid to 5.0 ± 0.1, post attaining the pH, the solution was allowed to mix for 5 min. Post mixing, 40 mM NaCl was added and the mixture was held at ambient (24 ± 3° C.) temperature until settling occurred. |
| 2. | T6 | RP-HPLC 3 EP 8.70 g/L concentration. diluted to 5.0 g/L with WFI, the dilution performed to attain 5 g/L was inclusive of 40 mM NaCl. Post dilution, crystallization-3 was performed by addition of required amount of 4% $ZnCl_2$ (0.5 mL/g). pH of the resultant solution was adjusted with 3.0M acetic acid to 5.0 ± 0.1, post attaining the pH, the solution was allowed it mix for 5 min. Post mixing, 40 mM NaCl was added and the mixture was held at cold (5 ± 3° C.) temperature until settling occurred. |
| 3. | T20 | RP-HPLC 3 EP 11.20 g/L conc. diluted to 5.0 g/L with WFI, the dilution performed to attain 5 g/L was inclusive of 40 mM NaCl. Post dilution, crystallization-3 was performed by addition of required amount of 4% $ZnCl_2$ (0.5 mL/g). pH of the resultant solution was adjusted with 3.0M acetic acid to 5.0 ± 0.1, post attaining the pH, the solution was allowed it mix for 5 min. Post mixing, 40 mM NaCl was added and the mixture was held at cold (5 ± 3° C.) temperature until settling occurred. |
| 4. | T21 | RP-HPLC 3 EP 11.20 g/L conc. diluted to 5.0 g/L with WFI, the dilution performed to attain 5 g/L was inclusive of 40 mM NaCl. Post dilution, crystallization-3 was performed by addition of required amount of 4% $ZnCl_2$ (0.5 mL/g). pH of the resultant solution was adjusted with 3.0M acetic acid to 5.0 ± 0.1, post attaining the pH, the solution was allowed to mix for 5 min. Post mixing, 40 mM NaCl was added and the mixture was held at ambient (24 ± 3° C.) temperature until settling occurred. |

TABLE 9 observations on reagent addition strategy 1

| Sr. No. | Trial No. | Conditions (Refer Table 8) | Settling (hr) | Settling bed appearance |
|---|---|---|---|---|
| 1. | T5 | RP-HPLC 3 EP conc –8.70 g/L Held at ambient (24 ± 3° C.) temperature until settling occurred. | 1.0 | Settled bed |
| 2. | T6 | RP-HPLC 3 EP conc –8.70 g/L Held at cold (5 ± 3° C.) temperature until settling occurred. | Not Applicable | Not settled |
| 3. | T20 | RP-HPLC 3 EP conc –11.20 g/L Held at cold (5 ± 3° C.) temperature until settling occurred. | Not Applicable | Not settled |

TABLE 9-continued observations on reagent addition strategy 1

| Sr. No. | Trial No. | Conditions (Refer Table 8) | Settling (hr) | Settling bed appearance |
|---|---|---|---|---|
| 4. | T21 | RP-HPLC 3 EP conc −11.20 g/L Held at ambient (24 ± 3° C.) temperature until settling occurred. | 1.0 | Settled bed |

The Strategy 2 is Addition of 4% ZnCl2+0.5M NaCl mixture to the FFC at 5.0 g/L elaborated as follows in table 10 and 11.

Strategy 2 was explored due to the inconsistent results of the strategy 1. Table 10 elaborates the details of the reagent addition performed for strategy 2. In this strategy, experiments were performed by mixing the required amount of 4% $ZnCl_2$ and 0.5M NaCl mixture and in turn added to the prepared FFC at 5.0 g/L. Following which crystallization-3 was performed by adjusting the pH with 3.0M Acetic acid to 5.0=0.1. Table 11 elaborates the details of the observations on reagent addition of strategy 1.

From the trial strategy 2 experiments (shown in FIGS. 5A and 5B), it was observed that the % of IPA in crystallization mixture remains same, but the IPA content (ppm) was varied. This resulted in a varied ambient hold temperature duration required to achieve similar settling across all the experiments. To normalize the IPA content in FFC, next set of trials were performed.

TABLE 10

Details of strategy-2 reagent addition

| Sr. No. | Trial No. | Conditions |
|---|---|---|
| 1. | T18 | RP-HPLC 3 EP 11.38 g/L conc. diluted to 5.0 g/L with RP-HPLC 3 Blank Buffer (16% IPA+ 84% 50 mM Acetic acid). Post dilution, crystallization-3 was performed by addition of required amount of 4% $ZnCl_2$ + 0.5M NaCl (0.5 mL/g + 40 mM) mixture. pH of the resultant solution was adjusted with 3.0M acetic acid to 5.0 ± 30.1, post attaining the pH, the solution was allowed to mix for 5 min. Post mixing, the mixture was held at ambient (24 ± 3° C.) temperature until settling occurred. |
| 2. | T19 | RP-HPLC 3 EP 7.35 g/L conc. diluted to 5.0 g/L with WFI. Post dilution, crystallization-3 was performed by addition of required amount of 4% $ZnCl_2$ + 0.5M NaCl (0.5 mL/g + 40 mM) mixture. pH of the resultant solution was adjusted with 3.0M acetic acid to 5.0 ± 0.1 post attaining the pH, the solution was allowed to mix for 5 min. Post mixing, the mixture was held at ambient (24 ± 3° C.) temperature until settling occurred. |
| 3. | T20 | RP-HPLC 3 EP 11.38 g/L conc. diluted to 5.0 g/L with WFI, Post dilution, crystallization-3 was performed by addition of required amount of 4% $ZnCl_2$ + 0.5M NaCl (0.5 mL/g + 40 mM) mixture. pH of the resultant solution was adjusted with 3.0M acetic acid to 5.0 ± 0.1, post attaining the pH, the solution was allowed to mix for 5 min. Post mixing, the mixture was held at ambient (24 ± 3° C.) temperature until settling occurred. |
| 4. | T23 | RP-HPLC 3 EP 11.38 g/L conc. diluted to 8.0 g/L with RP-HPLC 3 Blank Buffer (16% IPA + 84% 50 mM Acetic acid) and further diluted to 5.0 g/L with WFI. Post dilution, crystallization-3 was performed by addition of required amount of 4% $ZnCl_2$ + 0.5M NaCl (0.5 mL/g + 40 mM) mixture. pH of the resultant solution was adjusted with 3.0M acetic acid to 5.0 ± 0.1, post attaining the pH, the solution was allowed to mix for 5 min. Post mixing, the mixture was held at ambient (24 ± 3° C.) temperature until settling occurred |
| 5. | T25 | RP-HPLC 3 EP 11.38 g/L conc. diluted to 9.0 g/L with RP-HPLC 3 Blank Buffer (16% IPA+ 84% 50 mM Acetic acid) and further diluted to 5.0 g/L with WFI. Post dilution, crystallization-3 was performed by addition of required amount of 4% $ZnCl_2$ + 0.5M NaCl (0.5mL/g + 40 mM) mixture. pH of the resultant solution was adjusted with 3.0M acetic acid to 5.0 ± 0.1, post attaining the pH, the solution was allowed to mix for 5 min. Post mixing, the mixture was held at ambient (24 ± 3° C.) temperature until settling occurred. |
| 6. | T26 | RP-HPLC 3 EP 11.38 g/L conc. diluted to 10.0 g/L with RP-HPLC 3 Blank Buffer (16% IPA+ 84% 50 mM Acetic acid) and further diluted to 5.0 g/L with WFI. |

TABLE 10-continued

Details of strategy-2 reagent addition

| Sr. No. | Trial No. | Conditions |
|---|---|---|
| | | Post dilution, crystallization-3 was performed by addition of required amount of 4% $ZnCl_2$ + 0.5M NaCl (0.5 mL/g + 40 mM) mixture. pH of the resultant solution was adjusted with 3.0M acetic acid to 5.0 ± 0.1, post attaining the pH, the solution was allowed to mix for 5 min. Post mixing, the mixture was held at ambient (24 ± 3° C.) temperature until settling occurred. |

TABLE 11

Observations on reagent addition strategy 2

| | | | Observations | | |
|---|---|---|---|---|---|
| Sr. No. | Trial No. | Conditions (Refer Table 10) | Settling (h) | Crystal size (μm) | IPA content (ppm) |
| 1. | T18 | RP-HPLC 3 EP conc −11.38 g/L EP diluted to 5.0 g/L with RP-HPLC 3 Blank Buffer (16% IPA + 84% 50 mM Acetic acid). | 1.0 | >20 | 26409600 |
| 2. | T19 | RP-HPLC 3 EP conc −7.35 g/L EP diluted to 5.0 g/L with WFI. | 1.5 | >15+ | 17965714 |
| 3. | T20 | RP-HPLC 3 EP conc −11.38 g/L EP diluted to 5.0 g/L with WFI. | 9.0 | >50 | 11603515 |
| 4. | T23 | RP-HPLC 3 EP conc −11.38 g/L EP diluted to 8.0 g/L with RP-HPLC 3 Blank Buffer (16% IPA + 84% 50 mM Acetic acid) and further diluted to 5.0 g/L with WFI. | 2.0 | >20 | 16506000 |
| 5. | T25 | RP-HPLC 3 EP conc −11.38 g/L. EP diluted to 9.0 g/L with RP-HPLC 3 Blank Buffer (16% IPA + 84% 50 mM Acetic acid) and further diluted to 5.0 g/L with WFI. | 3.0 | >20 | 14672000 |
| 6. | T26 | RP-HPLC 3 EP conc −11.38 g/L EP diluted to 10.0 g/Lwith RP-HPLC 3 Blank Buffer (16% IPA + 84% 50 mM Acetic acid) and further diluted to 5.0 g/L with WFI. | 2.5 | Precipitate | 13204800 |

Example 2: Impact and the Role of IPA Content in FFC

Based on the observations in reagent addition chronology experiments and the observed variation in IPA content (ppm) in FFC; trials were performed by normalizing the IPA content (ppm) in FFC to hasten the settling rate during neat settling.

Table 12 elaborates the RP-HPLC3 EP dilution by targeting IPA content (ppm) in FFC whereas table 13 and FIG. 6 elaborate the observations of the impact of IPA content in FFC.

The IPA content (ppm) in FFC is vital for achieving desired settling and crystal size. However, the repetition of IPA content target experiments did not result in the similar crystal size. This observation led to study the rate of pH adjustment as one of the key factor that might influence crystal size.

TABLE 12

RP-HPLC3 EP dilution by targeting IPA content (ppm) in FFC

| Sr. No | Trial No. | Conditions |
|---|---|---|
| 1 | T53 | RP-HPLC 3 EP 6.58 g/L conc. diluted to 5.0 g/L with Blank buffer (2% IPA + 98% WFI) targeting 20 million IPA content (ppm) in FFC, Post dilution, crystallization-3 was performed by addition of required amount of 4% $ZnCl_2$ + 0.5M NaCl (0.5 mL/g + 40 mM) mixture. pH of the resultant solution was adjusted with 3.0M acetic acid to 5.0 ± 0.1, post attaining the pH, the solution was allowed to mix for 5 min. Post mixing, the mixture was held at ambient (24 ± 3° C.) temperature until settling occurred. |

TABLE 12-continued

RP-HPLC3 EP dilution by targeting IPA content (ppm) in FFC

| Sr. No | Trial No. | Conditions |
|---|---|---|
| 2 | 002(16)A | RP-HPLC 3 EP 13.13 g/L conc. diluted to 5.0 g/L with WFI, (IPA content is not targeted in FFC). Post dilution, crystallization-3 was performed by addition of required amount of 4% $ZnCl_2$ + 0.5M NaCl (0.5 mL/g + 40 mM) mixture. pH of the resultant solution was adjusted with 3.0M acetic acid to 5.0 ± 0.1, post attaining the pH, the solution was allowed to mix for 5 min. Post mixing, the mixture was held at ambient (24 ± 3° C.) temperature until settling occurred. |
| 3 | 002(16)B | Small portion of 002(16) A crystallization mixture was separated and stimulated with 100% IPA targeting 21 million. Post IPA stimulation, the mixture was held at ambient temperature for settling |
| 4 | 002(02) | RP-HPLC 3 EP 7.27 g/L conc. diluted to 5.0 g/L with Blank buffer (6.5% IPA + 93.5% WFI) targeting 21 million IPA content (ppm) in FFC, Post dilution, crystallization-3 was performed by addition of required amount of 4% $ZnCl_2$ + 0.5M NaCl (0.5 mL/g + 40 mM) mixture. pH of the resultant solution was adjusted with 3.0M acetic acid to 5.0 ± 0.1, post attaining the pH, the solution was allowed to mix for 5 min. Post mixing, the mixture was held at ambient (24 ± 3° C.) temperature until settling occurred. |

TABLE 13

Observation of the impact of IPA content in FFC

| Sl. no | Trial No | Conditions (Refer Table 12) | Settling (h) | Settling bed appearance | Crystal size (μm) |
|---|---|---|---|---|---|
| 1. | T53 | RP-HPLC 3 EP 6.58 g/L conc. diluted to 5.0 g/L with Blank buffer (2% IPA + 98% WFI) targeting 20 million IPA content (ppm) in FFC. | 1 | Settled bed | >20 |
| 2. | 002(16)A | RP-HPLC 3 EP 13.13 g/L conc. diluted to 5.0 g/L with WFI, (IPA content is not targeted in FFC). | 3 | Not settled | Nucleation started |
| 3. | 002(16)B | Small portion of 002(16) A crystallization mixture was aliquoted and stimulated with 100% IPA targeting 21 million. | 3 | Settled bed | >20 |
| 4. | 002(02) | RP-HPLC 3 EP 7.27 g/L conc. diluted to 5.0 g/L with Blank buffer (6.5% IPA + 93.5% WFI) targeting 21 million IPA content (ppm) in FFC. | 3 | Settled bed | 5 |

Example 3: The Impact of Rate of pH Adjustment

Based on the varying crystal sizes (μm) observed despite appropriate addition of reagents (NaCl+$ZnCl_2$) (discussed in example 1) and targeting IPA (ppm) in FFC (discussed in example 2), experiments elaborated in table 14 were performed to understand the impact of rate of pH adjustment. The IPA content targeted to 21 million in FFC. The addition of 3M acetic acid for attaining the crystallization pH to 5.0±0.1 has to be 0.1 vvm irrespective of the scale of crystallization (refer Table 15).

TABLE 14

Details for rate of pH adjustment

| Sl.no | Trial No | Conditions |
|---|---|---|
| 1. | 002(09) | RP-HPLC 3 EP 7.34 g/L conc. at pH 7.30 diluted to 5.0 g/L with Blank buffer (6.2% IPA + 83.8% WFI) targeting 21 million IPA content (ppm) in FFC. |

TABLE 14-continued

Details for rate of pH adjustment

| Sl.no | Trial No | Conditions |
|---|---|---|
| | | Post dilution, crystallization-3 was performed by addition of required amount of 4% $ZnCl_2$ + 0.5M NaCl (0.5 mL/g + 40 mM) mixture at 0.015 vvm of FFC.<br>pH of the resultant solution was adjusted with 3.0M acetic acid to 5.0 ± 0.1 at 0.001 vvm and post attaining the pH, the solution was allowed to mix for 5 min.<br>Post mixing, the mixture was held at ambient (24 ± 3° C.) temperature until settling occurred. |
| 2. | 002(10) | RP-HPLC 3 EP at pH 7.30 was further adjusted to pH 7.50 with 2M TRIS.<br>RP-HPLC 3 EP 7.34 g/L conc. at pH 7.50 diluted to 5.0 g/L with Blank buffer (6.2% IPA + 83.8% WFI) targeting 21 million IPA content (ppm) in FFC.<br>Post dilution, crystallization-3 was performed by addition of required amount of 4% $ZnCl_2$ + 0.5M NaCl (0.5 mL/g + 40 mM) mixture at 0.015 vvm of FFC.<br>pH of the resultant solution was adjusted with 3.0M acetic acid to 5.0 ± 0.1 at 0.001 vvm and post attaining the pH, the solution was allowed to mix for 5 min.<br>Post mixing, the mixture was held at ambient (24 ± 3° C.) temperature until settling occurred. |
| 3. | 002(11) | RP-HPLC 3 EP at pH 7.30 was further adjusted to pH 7.50 with 2M TRIS.<br>RP-HPLC 3 EP 7.34 g/L conc. at pH 7.50 diluted to 5.0 g/L with Blank buffer (6.2% IPA+ 83.8% WFI) targeting IPA content 21 million in FFC,<br>Post dilution, crystallization-3 was performed by addition of required amount of 4% $ZnCl_2$ + 0.5M NaCl (0.5 mL/g + 40 mM) mixture at 0.015 vvm of FFC.<br>pH of the resultant solution was adjusted with 3.0M acetic acid to 5.0 ± 0.1 by bolus addition and post attaining the pH, the solution was allowed to mix for 5 min.<br>Post mixing, the mixture was held at ambient (24 ± 3° C.) temperature until settling occurred. |
| 4. | 002(13) | RP-HPLC 3 EP 7.34 g/L conc. at pH 7.30 diluted to 5.0 g/L with Blank buffer (6.2% IPA + 83.8% WFI) targeting 21 million IPA content (ppm) in FFC.<br>Post dilution, crystallization-3 was performed by addition of required amount of 4% $ZnCl_2$ + 0.5M NaCl (0.5 mL/g + 40 mM) mixture by bolus addition.<br>pH of the resultant solution was adjusted with 3.0M acetic acid to 5.0 ± 0.1 by bolus addition and post attaining the pH, the solution was allowed to mix for 5 min.<br>Post mixing, the mixture was held at ambient (24 ± 3° C.) temperature until settling occurred. |
| 5. | 002(14) | RP-HPLC 3 EP at pH 7.30 was further adjusted to pH 7.50 with 2M TRIS.<br>RP-HPLC 3 EP 7.34 g/L conc. at pH 7.50 diluted to 5.0 g/L with Blank buffer (6.2% IPA + 83.8% WFI) targeting 21 million IPA content (ppm) in FFC.<br>Post dilution, crystallization-3 was performed by addition of required amount of 4% $ZnCl_2$ + 0.5M NaCl (0.5 mL/g + 40 mM) mixture by bolus addition and post attaining the pH, the solution was allowed to mix for 5 min.<br>pH of the resultant solution was adjusted with 3.0M acetic acid to 5.0 ± 0.1 by bolus addition and post attaining the pH, the solution was allowed to mix for 5 min.<br>Post mixing, the mixture was held at ambient (24 ± 3° C.) temperature until settling occurred. |
| 6. | 002(15) | RP-HPLC 3 EP at pH 7.30 was further adjusted to pH 7.50 with 2M TRIS.<br>RP-HPLC 3 EP 7.34 g/L conc. at pH 7.50 diluted to 5.0 g/L with Blank buffer (6.2% IPA + 83.8% WFI) targeting 21 million IPA content (ppm) in FFC.<br>Post dilution, crystallization-3 was performed by addition of required amount of 4% $ZnCl_2$ + 0.5M NaCl (0.5 mL/g + 40 mM) mixture at 0.015 vvm of FFC.<br>pH of the resultant solution was adjusted with 3.0M acetic acid to 5.0 ± 0.1 by bolus addition and post attaining the pH, the solution was allowed it mix for 5 min.<br>Post mixing, the mixture was held at ambient (24 ± 3° C.) temperature until settling occurred. |

TABLE 15

Matrix of pH adjustment data and observation

| Sr. no | Trial No | Conditions (Refer Table 14) | ZnCl2 + NaCl mixture | 3M Acetic acid for pH adjustment | Settling (hr) | Crystal size (μm) |
|---|---|---|---|---|---|---|
| 1. | 002(09) | RP-HPLC3 EP pH 7.30 | Slow (0.015 vvm) | Slow (0.001 vvm) | 1 | Micro crystal |
| 2. | 002(10) | RP-HPLC3 EP pH 7.50 | Slow (0.015 vvm) | Slow (0.001 vvm) | 1 | 10 |
| 3. | 002(11) | RP-HPLC3 EP pH 7.50 | Slow (0.015 vvm) | Bolus | 1 | >20 |
| 4. | 002(13) | RP-HPLC3 EP pH 7.30 | Bolus | Bolus | 3 | >20 |
| 5. | 002(14) | RP-HPLC3 EP pH 7.50 | Bolus | Bolus | 1 | >20 |
| 6. | 002(15) | RP-HPLC3 EP pH 7.50 | Slow (0.015 vvm) | Bolus | 1 | >20 | tions. The same RP-HPLC 3 EP was utilized for crystallization-3 experiments, found no impact on crystallization process.

RP-HPLC3 EP was used for scale up trial.

TABLE 16

RP-HPLC3 Load purity profile

| Sample | Conc. (g/L) | Purity (%) | 0.85-0.86 RRT | 0.92-0.93 RRT | 0.95-0.96 RRT | 1.03-1.04 RRT |
|---|---|---|---|---|---|---|
| Load spec. | Not more than 5.0 g/L | 98.6% | Not more than 0.18% | Not more than 0.10% | Not more than 0.35% | Not more than 0.25% |
| Load | 4.20 | 98.28 | 0.17 | 0.07 | 1.06* | 0.13 |

*0.95 + 0.96 RRT was out of specification for RP-HPLC 3 Load.

| Sample EP spec. | Loading (g/L) | Purity (%) NLT 99.50% | 0.85-0.86 RRT BLOQ (0.05%) | 0.95-0.96 RRT Not more than 0.10% | 1.03-1.04 RRT Not more than 0.10% | Conc. (g/L) | Yield (%) | EP in CVs | % B start | % B End |
|---|---|---|---|---|---|---|---|---|---|---|
| 001(04) EP | 50.05 | 99.75 | 0.00 | 0.10* | 0.07 | 12.87 | 81.62 | 3.17 | 15.5 | 17.4 |
| 002(01) EP | 23.35 | 99.85 | 0.00 | 0.00 | 0.09 | 7.27 | 80.01 | 2.57 | 15.7 | 17.2 |
| 002(03) EP | 23.35 | 99.82 | 0.00 | 0.05 | 0.09 | 7.49 | 76.79 | 2.39 | 15.4 | 16.8 |
| 002(12) EP | 50.42 | 99.74 | 0.00 | 0.10* | 0.07 | 13.15 | 84.26 | 3.23 | 15.8 | 17.4 |

*Higher level of 0.95/0.96 RRT was observed due to the higher level of the same at RP-HPLC3 Load stage, though the values are within the specification.

Example 4: The Impact of RP-HPLC3 Product Binding Capacity on Crystallization To challenge the RP-HPLC3 product binding capacity as well as to understand the impact of RP-HPLC 3 product dynamic binding capacity (DBC) at final crystallization stage, RP-HPLC3 trials were performed at two different DBCs, one at 23 g/L and another one at 50 g/L to accommodate and propose the wider range of DBC at manufacturing scale unlike the current control limit for RP-HPLC 3 DBC (25 to 40.0 g/L). FIG. 8 shows the RP-HPLC 3 DBC study flow chart.

RP-HPLC 2 load was procured from the manufacturing facility and RP-HPLC 2 and RP-HPLC 3 steps were performed at pilot lab as per insulin biosimilar process. All the individual fractions (after RPHPLC3) were adjusted to 7.35±0.1 after the elution. After pooling the fractions, pH of RPHPLC3 bulk EP was checked and adjusted to 7.4±0.1. Individual fractions pH essentially were not less than 7.3, as it may trigger protein precipitation.

Table 16 elaborate the RP-HPLC3 Load purity profile wherein table 17 elaborate RP-HPLC3 process performance and quality attributes at different DBC.

Quality attributes of RP-HPLC3 EP, which was generated at different DBC were comparable with control specifica- Table 17: RP HPLC3 process performance and quality attributes at different DBC

Example 5: Scale-Up Trial

From the various earlier trials (referred in example 1-4), it was observed that the reagent addition chronology, IPA content (ppm), pH adjustment rate and ambient hold temperature are vital for crystallization-3 process.

Based on the understanding, gained from various experiments, scale up trials were designed while keeping following process parameters under check (Table 18). Table 19 elaborates the scale up performance with respect to process & quality wherein FIG. 9 shows the images of crystals obtained upon scale-up.

TABLE 18

Process parameters that were under check during scale-up of crystallization-3

| Process parameters | Trial 1 | Trial2 | Trial |
|---|---|---|---|
| RP-HPLC 3 DBC (g/L) | 50 g/L | 25 g/L | 50 g/L |
| FFC conc. (g/L) | | 5.0 ± 0.2 | |
| Target IPA content (ppm) at FFC stage | | 21 | |
| Addition of 0.5M NaCl + % ZnCl₂ mixture | 40 mM NaCl + 0.5 mL/g ZnCl₂ @ ≤0.006 vvm | | |

TABLE 18-continued

Process parameters that were under check during scale-up of crystallization-3

| Process parameters | Trial 1 | Trial2 | Trial |
|---|---|---|---|
| Mode of pH adjustment (5.0 ± 0.1) | Bolus (≥0.1 vvm) | | |
| Agitation time after pH adjustment (min) | 15 to 20 | | |
| Ambient temperature hold during neat settling (h) | 3.0 to 4.0 | | |
| % neat decantation | 85-90% | | |
| Fold wash after neat decantation | 8 fold | | 10 fold |
| % Wash decantation | ≥95-97% | | |

TABLE 19

Scale up performance-process & quality

| Stage | Attributes | T003 | T004 | T006 |
|---|---|---|---|---|
| FFC | Conc. (g/L) | 4.96 | 5.01 | 5.14 |
| FFC (before pH adjustment) | pH | 7.36 | 7.60 | 7.35 |
| | Conductivity (mS/cm) | 0.39 | 0.80 | 0.34 |
| FFC (After pH adjustment) | pH | 4.83 | 5.01 | 5.02 |
| | Conductivity (mS/cm) | 3.39 | 3.67 | 3.26 |
| Neat Settling | Ambient hold (h) | 3.0 | 3.0 | 2 |
| | Temperature | 5 ± 3° C. | 5 ± 3° C. | 5 ± 3° C. |
| | Time | 3.5 h | 4.0 h | 15.5 h |
| | % Decantation | 87.70 | 89.02 | 85.02 |
| Neat Decanted supernatant | Sup conc. (mg/mL) | 0.23 | 0.07 | 0.10 |
| | pH | 4.86 | 5.06 | 5.03 |
| | Conductivity (mS/cm) | 3.45 | 3.56 | 2.99 |
| Wash settling temperature | Temp. | 5 ± 3° C. | 5 ± 3° C. | 5 ± 3° C. |
| Wash Decanted supernatant | pH | 4.83 | 5.02 | 5.01 |
| | Conductivity (mS/cm) | 0.58 | 0.50 | 0.39 |
| | % Decantation | 94.86 | 95.51 | 96.97 |
| | Sup conc. (mg/mL) | 0.05 | 0.03 | 0.10 |
| Neat Slurry | Insushort purity (%) | 99.77 | 99.80 | 99.74 |
| | HMWP (%) | 0.072 | 0.048 | 0.040 |
| FFL Feed for Lyophilisation | Insushort purity (%) | Not Available | 99.76 | Not Available |
| | HMWP (%) | Not Available | Not Available | 0.045 |

Example 6: The Sub-Optimal Freeze-Drying During Insulin Biosimilar Batch

Due to the poor settling at neat settling stage during the Crystallization 3 stage of Insulin biosimilar process, lower decantation was performed at each stage (neat and wash). As per the general trend (data obtained upon following old process mentioned in FIG. 2), volume for freeze-drying is observed to be in the range of 30±2 Litres but it was found to be 34.46 Litres in this batch. As per the BMR limit, maximum volume, which could be loaded on each tray, should be 1.28 Litre (which corresponds to the 1.1 cm bed height) but due to the higher volume after wash decantation, average volumetric distribution of slurry in each tray was 1.436 Litre, which corresponds to the 1.23 cm bed height). In addition, the observed slurry percentage, which was loaded in each tray, was approximately 5%.

To understand the impact of Slurry percentage and bed height on Freeze-drying efficiency, the following trial elaborated in table 20 was designed. Manufacturing slurry (re-dissolved slurry) was procured to understand the impact of bed height & slurry percentage on freeze drying efficiency (Table 21).

From the results, it was quite evident that, at lower slurry percentage (4-5%), increase in bed height can impact on the moisture content (LOD value). Higher the bed height (with lower slurry percentage) in freeze drying tray would result in inefficient drying and sublimation.

TABLE 20

Freeze-drying trial

| Slurry % | Bed height (cm) | Total challenge to the condenser |
|---|---|---|
| 8% | 1.2 cm | 20% of total capacity |
| | 1.4 cm | |
| 4% | 1.2 cm | |
| | 1.4 cm | |
| | 1.6 cm | |

TABLE 21

Freeze drying process outcome

| Slurry % | Bed height (cm) | LOD value |
|---|---|---|
| 8% | 1.2 cm | 4.45% |
| | 1.4 cm | Didn't dry |
| 4% | 1.2 cm | 8.04% |
| | 1.4 cm | Did not dry |
| | 1.6 cm | Did not dry |

Summary of Final Drug Substance Quality Attributes (3 Scale Up Experiments)

For a particular crystallization condition (as captured in the 'condition' section of each table), observations are captured pertaining to each unique experiment. Table 22 elaborates the summary of final drug substance from revised crystallization process whereas table 23 elaborates the list of critical process parameter and its impact observed during the trails conducted (referred in example 1-6).

TABLE 22

Summary of Final drug substance from revised crystallization process

| Stage | Parameter | T003 Trial 1 | T004 Trial 2 | T006 Trial 3 | USP monograph Specification |
|---|---|---|---|---|---|
| DS | ORP% (RS) | 0.08 | 0.07 | 0.11 | Not more than 2.0% |
| | A21% (RS) | 0.04 | 0.04 | 0.039 | Not more than 2.0% |
| | HMWP % value | 0.13 | 0.12 | 0.1 | Not more than 1.0% |
| | Insushort purity (%) | 99.54 | 99.71 | 99.52 | Not Applicable |
| | IPA (ppm) | 791.0 | 1037.53 | 1432 | Not more than 5000 ppm |
| | LOD (%) | 1.99 | 2.68 | 2.56 | Not more than 10.0% |
| | ROI (%) | 1.05 | 1.11 | Not Available | Not Applicable |
| | Zn (%) | 0.38 | 0.40 | 0.39 | Not more than 1.00% |

TABLE 23

List of critical process parameter and its impact

| Stage | Parameter | Targeted range | Impact of the parameter |
|---|---|---|---|
| Crystallization | IPA content (ppm) ppm at FFC stage | 21 million | Lower IPA would result in inefficient settling of crystals while higher IPA can pose the challenges for its removal in DS |
| | pH adjustment rate first pulse (target pH 5.0 ± 0.1) | 0.1 vvm | vvm directly (positive correlation) impacts crystal size |
| | Mixing rate & time after final pH adjustment pH 5.0 ± 0.1 | 0.21 m/s mixing rate & 20 min Mixing time | Mixing rate and time are crucial to aid crystallization |
| | Ambient Temperature hold duration during neat settling | 2.5-4 hours | Lower ambient hold would result in poor settling while higher hold duration would lead to increase in aggregates (HMWP) |
| Freeze drying | Bed height | Not more than 1.1 cm | Higher bed height could result in inefficient sublimation and there by drying. |

CONCLUSION

Based on the above data, it's evident that performing crystallization-3 process with FFC targeting 21 million IPA content (ppm), followed by addition of ZnCl$_2$+NaCl mixture, & comparatively faster rate of pH adjustment and ambient temperature hold are vital for protein crystallization, settling and consistent crystal size. Performing remaining neat settling and complete wash, both at cold temperature (5±3° C.) can certainly add up to the process robustness and better control of critical quality attributes at final drug substance stage.

The process thus reduced time for sedimentation at manufacturing scale. In traditional process, the sedimentation used to take up to 24-60 hours whereas the present invention achieves the

The invention claimed is:

1. A method for preparing a recombinant human insulin crystal comprising the steps of:
    (a) dissolving a recombinant human insulin in a crystallization solution comprising an organic solvent and water;
    (b) adding an aqueous solution comprising a mixture of zinc chloride and a salt to the crystallization solution at a final concentration of 0.3-0.5 ml per gram of recombinant human insulin;
    (c) adjusting the pH of the crystallization solution to a range of 4.8 to 5.2 within 5 minutes following step (b);
    (d) neat settling the crystallization solution at room temperature followed by a chilling neat settling at a chilling temperature to obtain a slurry containing the recombinant human insulin; and
    (e) freeze drying the slurry and thereby obtaining the recombinant human insulin crystal.

2. The method according to claim 1, wherein the organic solvent is selected from acetonitrile, ethanol, n-propanol and isopropyl alcohol.

3. The method according to claim 2, wherein the organic solvent is isopropyl alcohol.

4. The method according to claim 3, wherein the isopropyl alcohol is in a concentration of 19-25 ppm.

5. The method according to claim 1, wherein the salt is selected from sodium chloride, sodium acetate and sodium citrate.

6. The method according to claim 5, wherein the salt is sodium chloride.

7. The method according to claim 6, wherein the sodium chloride is added to the crystallization solution to obtain a final concentration of 40 mM.

8. The method according to claim 1, wherein the pH of the crystallization solution is adjusted to 5.0 using 3M acetic acid.

9. The method according to claim 1, wherein the neat settling of step (d) comprises keeping the crystallization solution for 2.5 to 4 hours at a temperature between 21° C. to 27° C.

10. The method according to claim 1, wherein the chilling neat settling of step (d) comprises keeping the crystallization solution for 10 to 12 hours at a temperature between 2° C. to 8° C.

11. The method according to claim 1, wherein the freeze drying of step (e) is in a freeze drying tray having a bed height of 1.1 cm.

12. The method according to claim 1, wherein the crystallization solution of step (a) contains 5.0±0.2 g/L of recombinant human insulin and 21 ppm of isopropyl alcohol.

13. The method according to claim 1, wherein the recombinant human insulin is from a high performance liquid chromatography (HPLC) elution.

14. The method according to claim 1, further comprising decanting a first supernatant from the slurry after step (d), adding chilled water to the slurry in an agitated state at a top speed of 0.21 m/s for up to 5 minutes, keeping the slurry at 2-8° C. for 16 hours, and decanting a second supernatant from the slurry before proceeding to step (e).

15. The method according to claim 14,
    wherein the crystallization solution of step (a) is derived from an HPLC elution diluted with water and isopropyl alcohol until the crystallization solution contains 5.0±0.2 g/L of recombinant human insulin;
    wherein the solution of step (b) comprises 4% zinc chloride and 0.5 M sodium chloride and is added to the crystallization solution at 0.006 volume per volume per minute under a stirring condition at a top speed of 0.42-0.52 m/s;
    wherein the pH of step (c) is adjusted to 5.0 by adding 3M acetic acid to the crystallization solution at 0.1 volume per volume per minute under agitation at a top speed of 0.42-0.52 m/s;
    wherein the agitation is continued for 15-20 minutes at 0.21 m/s post the pH adjustment and before step (d);
    wherein the neat setting of step (d) comprises keeping the crystallization solution at a temperature of 23±3° C. for 2.5 to 4 hours; and
    wherein the chilling neat settling of step (d) comprises keeping the crystallization solution at a temperature of 2-8° C. for 10 to 12 hours.

* * * * *